US007116469B2

(12) United States Patent
Bragheri et al.

(10) Patent No.: US 7,116,469 B2
(45) Date of Patent: Oct. 3, 2006

(54) RAMAN AMPLIFICATION USING A MICROSTRUCTURED FIBER

(75) Inventors: Attilio Bragheri, Vigevano (IT); Glulia Pietra, Pavia (IT); Giacomo Gorni, Pavia (IT); Marco Romagnoli, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/499,020

(22) PCT Filed: Dec. 21, 2001

(86) PCT No.: PCT/EP01/15262

§ 371 (c)(1),
(2), (4) Date: May 13, 2005

(87) PCT Pub. No.: WO03/055017

PCT Pub. Date: Jul. 3, 2003

(65) Prior Publication Data
US 2005/0225841 A1 Oct. 13, 2005

(51) Int. Cl.
H01S 3/30 (2006.01)
(52) U.S. Cl. .................... 359/334; 359/341.1
(58) Field of Classification Search ......... 359/337.4, 359/337.5, 334, 341.1; 385/123
See application file for complete search history.

(56) References Cited

U.S. PATENT DOCUMENTS

| 5,802,236 | A | 9/1998 | DiGiovanni et al. |
| 6,418,258 | B1 * | 7/2002 | Wang ............... 385/125 |
| 6,542,681 | B1 * | 4/2003 | Broeng et al. ...... 385/123 |
| 6,571,045 | B1 * | 5/2003 | Hasegawa et al. ... 385/125 |
| 6,693,740 | B1 * | 2/2004 | Gray et al. ........ 359/337.4 |
| 6,792,188 | B1 * | 9/2004 | Libori et al. ....... 385/125 |

FOREIGN PATENT DOCUMENTS

WO  WO 00/60390  10/2000

OTHER PUBLICATIONS

Ranka, J.K. et al., "Visible Continuum Generation in Air-Silica Microstructure Optical Fibers with Anomalous Dispersion at 800 nm", Optics Letters, vol. 25, No. 1, pp. 25-27, (Jan. 1, 2000).
Tsuzaki, T. et al., "Broadband Discrete Fiber Raman Amplifier with High Differential Gain Operating Over 1.65 μm-band", OFC2001, Optical Society of America, pp. MA3-1-MA3-3, (2000).
West, J. A. et al., "Photonic Crystal Fibers", ECOC 2001, 3 sheets, (2001).

(Continued)

Primary Examiner—Mark Hellner
(74) Attorney, Agent, or Firm—Finnegan, Henderson, Farabow, Garrett & Dunner, L.L.P.

(57) ABSTRACT

A Raman amplifier having a microstructured fiber and at least one pump laser, optically connected to one end of the microstructured fiber. The pump laser is adapted for emitting a pump radiation at a wavelength $\lambda_p$, and the microstructured fiber has a silica-based core surrounded by a plurality of capillary voids extending in the axial direction of the fiber. The core of microstructured fiber has at least one dopant added to silica, the dopant being suitable for enhancing Raman effect.

42 Claims, 10 Drawing Sheets

OTHER PUBLICATIONS

Lee, J. H. et al., "A Holey Fibre Raman Amplifier and All-Optical Modulator", ECOC 2001, 2 sheets, (2001).

Agrawal, G. P., "Nonlinear Fiber Optics", Academic Press Inc., Second Edition, pp. 317-319, (1995).

Lines, M. E., "Raman-Gain Estimates for High-Gain Optical Fibers", J. Appl. Phys., vol. 62, No. 11, pp. 4363-4370, (Dec. 1, 1987).

Kerbage, C. E. et al., "Experimental and Scalar Beam Propagation Analysis of an Air-Silica Microstructure Fiber", Optics Express, vol. 7, No. 3, pp. 113-122, (Jul. 31, 2000).

Seo, H. S. et al., "Gain Optimization of Germanosilicate Fiber Raman Amplifier and Its Applications in the Compensation of Raman-Induced Crosstalk Among Wavelength Division Multiplexing Channels", IEEE Journal of Quantum Electronics, vol. 37, No, 9, pp. 1110-1116, (Sep. 2001).

Nakashima, T. et al., "Dependence of Raman Gain on Relative Index Difference for $GeO_2$-Doped Single-Mode Fibers", Optics Letters, vol. 10, No. 8, pp. 420-422, (Aug. 1985).

Bennett, P.J. et al., "Toward Practical Holey FIber Technology: Fabrication, Splicing, Modeling, and Characterization," Optics Letters, vol. 24, No. 17, Sep. 1, 1999, pp. 1203-1205.

Knight, J.C. et al., "All-Silica Single-Mode Optical Fiber With Photonic Crystal Cladding," Optics Letters, vol. 21, No. 19, Oct. 1, 1996, pp. 1547-1549.

* cited by examiner

RAMAN AMPLIFICATION USING A MICROSTRUCTURED FIBER

CROSS REFERENCE TO RELATED APPLICATIONS

This application is a national phase application based on PCT/EP01/15262, filed Dec. 21, 2001, the content of which is incorporated herein by reference.

BACKGROUND OF THE INVENTION

1. Field of the Invention

The present invention relates to a fiber Raman amplifier using a microstructured fiber and to a microstructured fiber suitable for Raman amplification. In particular, the present invention relates to a lumped fiber Raman amplifier and to a microstructured fiber suitable for a lumped fiber Raman amplifier.

2. Description of the Related Art

Fiber Raman amplifiers have been attracting a great attention, because of their capability to increase the transmission capacity. Raman amplifiers offer several advantages, such as a low noise, a greater flexibility in choosing the signal wavelength and a flat and broad gain bandwidth. The greater flexibility in choosing the signal wavelength mainly depends on the fact that the Raman peak of a material, exploited for the amplification of the signal, is dependent practically only on the pump wavelength, differently from what happens for example in erbium-doped fiber amplifiers, in which the choice of the signal wavelength is restricted by the stimulated emission cross-section of erbium. The broad gain bandwidth of Raman amplifiers can be much enlarged, for example by using multiple pump sources. Such a broad gain bandwidth may represent a way to extend the usable optical bandwidth outside the conventional C-band and the extended L-band of the erbium-doped fiber amplifiers. Lumped Raman amplifiers may also play an important role to compensate for not only the fiber attenuation but also losses of other optical components, such as connectors, switches, splitters and so on.

Up to now, dispersion compensating fibers (DCF) or, more generally, fibers having a high non-linearity have been proposed for realizing fiber Raman amplifiers. For example, T. Tsuzaki et al., in "Broadband Discrete Fiber Raman Amplifier with High Differential Gain Operating Over 1.65 μm-band", OFC2001 MA3-1, describe a high differential-gain (0.08 dB/mW), low-noise (<5.0 dB), broadband (30 nm) and flat-gain (<±1 dB) fiber Raman amplifier operating over the 1.65 μm-band which employs a low-lossy highly nonlinear fiber (HNLF) and a broadened pump light source. The fiber has a transmission loss of 0.49 dB/km at 1.55 μm and of 0.47 dB/km at 1.65 μm, an effective area $A_{eff}$ of 10.10 μm$^2$ at 1.55 μm, a dispersion of 1.79 ps/nm/km at 1.55 μm, a Δn of 3.10% and a ratio $g_R/A_{eff}$ of 6.50·10$^3$ 1/Wm. FIG. 1 of the article shows an attenuation at a wavelength of 1450 nm of about 0.7 dB/km.

In order to evaluate the Raman amplification characteristics free from the influence of the fiber length, the authors of the article use the following figure of merit:

$$\text{FOM} = (g_R/A_{eff})/\alpha_p \quad [1]$$

where $(g_R/A_{eff})$ and $\alpha_p$ are the Raman gain coefficient and the fiber attenuation at the pump wavelength. With 1450 nm pumping, the FOM is estimated to be 9.3 1/W/dB. If the pumping wavelength is set to 1550 nm, the FOM becomes as high as 13.2 1/W/dB.

Recently there has been a great interest in fiber structures that incorporate numerous air holes surrounding a solid silica core. These air-silica microstructured fibers, similar to earlier single-material optical fibers, guide light within the core as a result of the index difference between the silica core and the air-silica cladding. Microstructured fibers are also known in the art as "photonic crystal fibers" or as "holey fibers".

For example, J. A. West et al., "Photonic Crystal Fibers", ECOC 2001, Th A 2.2, review various types of air-silica microstructure fibers, such as effective-index photonic crystal fibers (EI-PCF), air-clad core fibers and photonic band-gap fibers (PBGF). EI-PCFs are typically made from a hexagonal lattice of circular air columns in which the periodicity is relatively uniform. Losses as low as 2.6 dB/km are reported for this kind of fiber by the authors. Air-clad core fibers contains only a single ring of holes. The justification for removing the outer layers of holes is that in the limit in which the wavelength is large compared to the distance among the holes Λ, the fiber behaves very much like an equivalent step-index fiber. When the air holes are very large this fiber becomes essentially a silica rod in air and thin silica struts, whose purpose is simply to support the core, can replace the periodic lattice of air holes. Typical losses of 5–10 dB/km are reported for this kind of fibers by the authors. PBGF relies completely on the physics of photonic band-gaps for waveguiding and allows true guidance in low index cores.

Microstructured fibers can differ significantly from conventional optical fibers, allowing for properties that cannot be realized in standard fibers.

For examples J. K. Ranka et al., in "Visible continuum generation in air-silica microstructure optical fibers with anomalous dispersion at 800 nm", Optics Letters, Vol. 25 No. 1, pag. 25–27 (2000) disclose that air-silica microstructure optical fibers can exhibit anomalous dispersion at visible wavelengths. They exploit this feature to generate an optical continuum 550 THz in width, extending from the violet to the infrared, by propagating pulses of 100-fs duration and kilowatt peak powers through a microstructure fiber near the zero-dispersion wavelength.

Microstructured fibers with doped cores have been proposed. For example, patent U.S. Pat. No. 5,802,236 to Lucent Technologies Inc. discloses a fiber having a solid silica core region that is surrounded by an inner cladding region and an outer cladding region. The cladding regions have capillary voids extending in the axial fiber direction, with the voids in the inner cladding region having a larger diameter than those in the outer cladding region. Applications disclosed in '236 patent of the microstructured fiber comprise all-optical non-linear Kerr switching in a fiber having a photosensitive core, using a Bragg or long period grating. Such fiber exemplarily has a Ge, B, or Sn-doped core.

In another example, C. E. Kerbage et al., in "Experimental and scalar beam propagation analysis of an air-silica microstructure fiber", Optics Express, Vol. 7 No. 3, pag. 113–121 (2000) study the higher order guided modes in an air-silica microstructure fiber comprising a ring of six large air-holes surrounding a Germanium doped core. They characterize the modes experimentally using an intra-core Bragg grating.

Microstructured fibers can reach high optical nonlinearity. The large refractive index contrast between silica and air means that it is possible to confine light to transverse modes with a dimension of the order of the wavelength of light, meaning that such fibers have an effective nonlinearity per unit length 10–100 times higher than that of conventional silica fiber. This characteristic can be advantageously exploited in order to reduce the length/power levels required for devices based on non-linear effects.

Raman amplification in a microstructured fiber has been proposed by J. H. Lee et al., in "A holey fiber Raman amplifier and all-optical modulator", ECOC 2001, Th A 4.1, who demonstrate the use of a short length of highly non-linear holey fiber to obtain strong L-band Raman amplification. Using a 75 m long holey fiber with an effective area of 2.85 $\mu m^2$ they obtain internal gains of over 42 dB and a noise figure of about 6 dB at 1640 nm. The loss of the fiber is 40 dB/km. The obtained gain efficiency is 6 dB/W. Further, the authors estimate the Raman gain coefficient $g_R$ to have a value of $7.6 \cdot 10^{-14}$ m/W.

The Applicant observes that a gain efficiency of 6 dB/W means that in order to realize an amplifier having an internal gain of 20–25 dB, a pump power of more than 3–4 W should be used. This makes the fiber described in the Lee et al.'s article quite unpractical for a real installation in a telecommunications system.

The Applicant has faced the problem of realizing a Raman amplifier using a microstructured fiber, capable of reaching high gain with low pump power requirements. The amplifier should preferably have a low noise figure. The Applicant has perceived that, in order to have high Raman gain efficiency, that is high gain with low pump power, the microstructured fiber should have a high figure of merit for Raman amplification, according to formula [1].

The Applicant has observed that by using the formula [1] given above for calculating the FOM for Raman amplification of the fiber described by Lee et al. in their article cited above, a value of 0.67 1/W/dB would be obtained, that is a very low value. According to the Applicant this is mainly due to the high attenuation (40 dB) of the microstructured fiber. The Applicant has however recognized that even if the attenuation of a microstructured air-silica fiber were lower, the figure of merit for Raman amplification of an air-silica fiber would be at most comparable with the figure of merit for Raman amplification of a conventional dispersion compensating fiber or of a conventional highly nonlinear fiber. By applying the formula [1] given above, a "best" value of about 10 1/W/dB would be obtained by considering a $g_R$ of $7.6 \cdot 10^{-14}$ m/W, a very low attenuation of the microstructured fiber at the pump wavelength of 2.6 dB/km and an effective area of 2.85 $\mu m^2$. That is, even by considering a very low attenuation of the air-silica microstructured fiber, such fiber would have a figure of merit for Raman amplification at most equal to the figure of merit obtainable with conventional dispersion compensating or highly nonlinear fibers. According to the Applicant, this is due to the higher attenuation of the microstructured fibers, that in the best cases up to now can reach values of about 2.6 dB/km with respect to values lower than 0.5 dB/km for the conventional fibers. The "best" result of the figure of merit of an air-silica microstructured fiber given above cannot be considered much satisfactory, as the manufacturing of an air-silica fiber having a very low attenuation is rather complicated with respect to the manufacturing of a conventional fiber. Further, such result would be obtained by using microstructured fibers having very low effective areas (for example 2.85 $\mu m^2$ in the example reported in Lee et al. article), giving rise to problems in the coupling of the pump radiation and of the optical signal in the microstructured fiber for amplification.

SUMMARY OF THE INVENTION

The Applicant has found that in order to obtain a microstructured fiber having a high figure of merit for Raman amplification without the need of an extremely low attenuation or an extremely low effective area, a dopant capable of enhancing the Raman effect should be added to silica in the core of a microstructured fiber in order to make the same suitable for a Raman amplifier. A dopant capable of enhancing the Raman effect is a dopant that enhances the value of the Raman gain coefficient $g_R$ with respect to the Raman gain coefficient of pure silica. A preferred suitable dopant is germanium.

In a first aspect thereof, the invention relates to a Raman amplifier comprising at least one microstructured fiber and at least one pump laser, optically connected to one end of said microstructured fiber, said pump laser being adapted for emitting a pump radiation at a wavelength $\lambda_p$, said microstructured fiber comprising a silica-based core surrounded by a plurality of capillary voids extending in the axial direction of the fiber. The core of the microstructured fiber comprises at least one dopant added to silica, said dopant being suitable for enhancing Raman effect.

Preferably, said microstructured fiber may have a maximum Raman gain coefficient $g_R$ in a wavelength region comprised between 1460 nm and 1650 nm, an attenuation $\alpha_p$ at said wavelength $\lambda_p$ and an effective area $A_{\mathit{eff}}$ at said wavelength $\lambda_p$, such that $(g_R/A_{\mathit{eff}})/\alpha_p$ is greater than or equal to 5 1/W/dB, more preferably greater than or equal to 10 1/W/dB.

A preferred dopant suitable for enhancing Raman effect may be germanium.

Preferably, the concentration of germanium in the core of the microstructured fiber may be higher than or equal to 8% mol, more preferably higher than or equal to 10% mol, even more preferably higher than or equal to 20% mol.

Preferably, the effective area $A_{\mathit{eff}}$ of said microstructured fiber may be lower than or equal to 10 $\mu m^2$ at said wavelength $\lambda_p$, more preferably lower than or equal to 7 $\mu m^2$ at said wavelength $\lambda_p$.

In order to facilitate coupling, the effective area $A_{\mathit{eff}}$ of said microstructured fiber may be higher than or equal to 3 $\mu m^2$ at said wavelength $\lambda_p$.

Advantageously, the attenuation $\alpha_p$ of the microstructured fiber may be lower than or equal to 10 dB/km at said wavelength $\lambda_p$, preferably lower than or equal to 5 dB/km at said wavelength $\lambda_p$.

In order to reduce the onset of four wave mixing in WDM systems, the dispersion of said microstructured fiber may be preferably higher than or equal to 40 ps/nm/km in absolute value at a wavelength of 1550 nm, more preferably higher than or equal to 70 ps/nm/An in absolute value at a wavelength of 1550 nm.

Preferably, said microstructured fiber may be single mode for wavelengths greater than or equal to 1430 nm.

In preferred embodiments, the diameter of the voids is comprised between 0.3 and 4.0 $\mu m$. Further, the distance between said voids may be preferably lower than 4.0 $\mu m$. The ratio between a diameter d of said voids and a distance $\Lambda$ between said voids may be preferably higher than 0.35.

Advantageously, the length of said microstructured fiber may be lower than or equal to 2000 m, preferably lower than 1000 m.

In a second aspect thereof, the invention relates a microstructured fiber suitable for guiding an optical signal having a wavelength lying in a wavelength band comprised between 1460 and 1650 nm, comprising a core surrounded by a plurality of capillary voids extending in the axial direction of the fiber. The core comprises silica and a dopant suitable for enhancing Raman effect. The fiber is further suitable for guiding a pump radiation having a wavelength $\lambda_p$ shifted with respect to at least one wavelength of said wavelength band in a lower wavelength region according to the Raman shift of said core. The fiber has a maximum Raman gain coefficient $g_R$ in said wavelength band, and an attenuation $\alpha_p$ and an effective area $A_{eff}$ at said wavelength $\lambda_p$, such that $(g_R/A_{eff})/\alpha_p$ is greater than or equal to 5 1/W/dB, preferably greater than or equal to 10 1/W/dB.

In a third aspect thereof, the invention relates a microstructured fiber comprising a core surrounded by a plurality of capillary voids extending in the axial direction of the fiber, said core comprising silica and germanium, characterized in that a concentration of germanium in said core is higher than or equal to 8%.

BRIEF DESCRIPTION OF THE DRAWINGS

Further features and advantages of the present invention will be better illustrated by the following detailed description, herein given with reference to the enclosed drawings, in which.

DETAILED DESCRIPTION OF THE INVENTION

Figure 1:
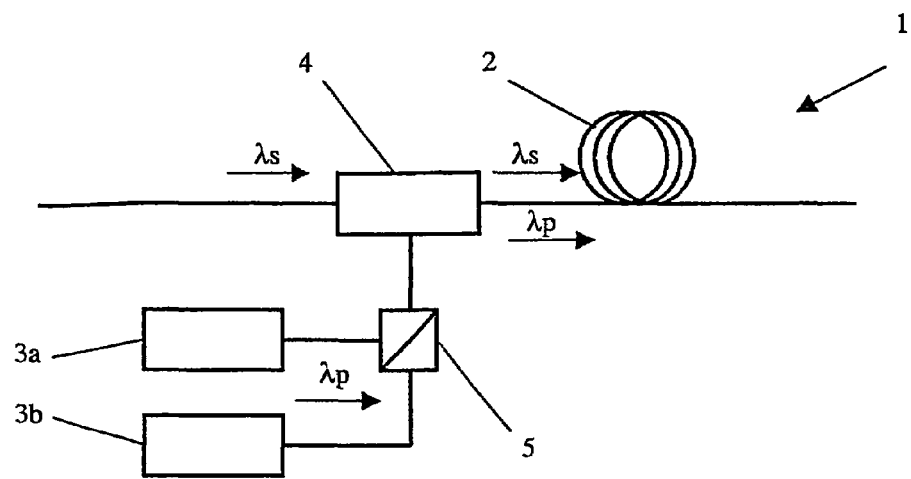
FIG. 1 schematically shows an embodiment of a Raman amplifier according to the invention.

FIG. 1 shows an embodiment of a Raman amplifier 1 according to the invention. The Raman amplifier 1 comprises a microstructured fiber 2 and at least one pump laser 3a, optically connected to one end of the microstructured fiber 2, for example through a WDM coupler 4.

In the exemplary preferred embodiment shown in FIG. 1 two pump lasers 3a, 3b are provided, adapted for emitting polarized pump radiation at a wavelength $\lambda_p$ and having substantially the same power emission. The two pump radiations are coupled together through a polarization beam splitter 5 so that orthogonal polarization states are sent downstream of the polarization beam splitter 5. The polarization beam splitter 5 is connected to one end of the WDM coupler 4. Another end of the WDM coupler 4 is adapted to receive an optical signal at a wavelength $\lambda_s$ to be amplified. A third end of the WDM coupler 4 is connected to the microstructured fiber 2. The optical connection of WDM coupler 4 to the microstructured fiber 2 may comprise focusing lenses or, more generally, a corrective optics, in order to optimize the coupling of the optical radiation in the fiber 2. In the configuration shown in FIG. 1, the optical signal and the pump radiation are co-propagating in the microstructured 2. An alternative embodiment may provide counter-propagation between optical signal and pump radiation. A further alternative embodiment may provide both co- and counter-propagating pump radiation with respect to the optical signal. In other embodiments, not shown, plural pump sources having different emission wavelengths may be provided. The Raman amplifier according to the invention may be a single stage amplifier, or a multi-stage amplifier, or may be a part of a multi-stage amplifier. Further, the Raman amplifier according to the invention may be combined with other types of amplifiers, such as for example erbium doped fiber amplifiers or semiconductor amplifiers.

The optical signal may have a wavelength $\lambda_s$ comprised between about 1460 nm and 1650 nm, preferably between about 1525 nm and 1625 nm. The radiation emitted by the pump lasers 3a, 3b is related to the signal radiation wavelengths: in order to have Raman amplification, the wavelength of the pump lasers should be shifted with respect to the signal radiation wavelengths in a lower wavelength region of the spectrum, such shift being equal to the Raman shift (see G. P. Agrawal, "Nonlinear Fiber Optics", Academic Press Inc. (1995), pag. 317–319) of the material comprised in the core of the microstructured fiber 2 for at least one signal radiation wavelength.

The Raman amplifier according to the invention may be part of an optical transmission system, advantageously a WDM transmission system, comprising a transmitting station, a receiving station and an optical line connecting said transmitting station and said receiving station. The transmitting station comprises at least one transmitter adapted to emit the optical signal carrying an information. For a WDM transmission, the transmitting station comprises a plurality of transmitters adapted to emit a respective plurality of optical channels, each having a respective wavelength. In this case, the optical signal is a WDM optical signal, comprising different optical channels. The receiving station comprises at least one receiver adapted to receive said optical signal and discriminate said information. For a WDM transmission, the receiving station comprises a plurality of receivers adapted to receive the WDM optical signal and discriminate the information carried by each optical channel received. The optical line comprises at least one transmission optical fiber. At least one amplifier, comprising at least one Raman amplifier according to the invention, is provided along the optical line in order to counteract attenuation introduced on the optical signal by at least a portion of said transmission optical fiber or fibers. Other sources of attenuation can be connectors, couplers/splitters and various devices, such as for example modulators, switches, add-drop multiplexers and so on, disposed along the optical line. The optical transmission system comprising at least one Raman amplifier according to the invention can be any kind of optical transmission system, such as for example a terrestrial transmission system or a submarine transmission system. The transmission system may also comprise other types of amplifiers, such as for example erbium doped fiber amplifiers or semiconductor amplifiers, in combination with at least one Raman amplifier according to the invention.

Coming back to FIG. 1, the microstructured fiber 2 included in the Raman amplifier 1 comprises a silica-based core surrounded by a plurality of capillary voids extending in the axial direction of the fiber.

Preferably, the voids surrounding the core of the microstructured fiber 2 are disposed so as to provide an effective area $A_{eff}$ lower than or equal to 10 $\mu m^2$, more preferably lower than or equal to 7 $\mu m^2$, the effective area $A_{eff}$ being evaluated at the pump wavelength $\lambda_p$. In case of use of a plurality of pump sources having a plurality of wavelength emissions, for the purposes of the evaluation of the effective area $A_{eff}$ the average of the pump wavelengths may be used. A low effective area advantageously enhances nonlinearity, in particular the Raman effect. For the purposes of the present invention, by effective area $A_{eff}$ it is intended a coefficient that can be calculated with the formula:

$$A_{eff} = \left[ \int_{-\infty}^{\infty} \int_{-\infty}^{\infty} |E(x,y)|^2 dx dy \right]^2 \bigg/ \int_{-\infty}^{\infty} \int_{-\infty}^{\infty} |E(x,y)|^4 dx dy \quad [2]$$

where E(x,y) is the electric field of a radiation having a wavelength $\lambda_p$ propagating in the microstructured fiber in the x-y plane, transverse to the z-propagation direction.

Preferably, the attenuation $\alpha_p$ at the pumping wavelength of the microstructured fiber 2 is lower than or equal to 10 dB/km, more preferably lower than or equal to 5 dB/km. In case of use of a plurality of pump sources having a plurality of wavelength emissions, for the purposes of the evaluation of the attenuation $\alpha_p$ the average of the pump wavelengths may be used.

In order to counteract four-wave-mixing, that can arise in case of WDM transmission due to the low effective area of the microstructured fiber 2, the voids surrounding the core of the microstructured fiber may be preferably disposed in order to have a chromatic dispersion (or simply dispersion) higher than or equal to 40 ps/nm/km in absolute value, more preferably higher than or equal to 70 ps/nm/km, at a wavelength of 1550 nm. Techniques readily available to the skilled in the art can be used in order to obtain such values of chromatic dispersion. Such techniques comprise for example suitably choosing the distance between the voids $\Lambda$, or the void diameter d, or the related ratio d/$\Lambda$, or any combination of these parameters. In the article of West et al., above cited, it is shown how the dispersion curve of an effective index photonic crystal fiber changes by modifying the ratio d/$\Lambda$ from a value of 0.40 to a value of 0.90, with a value of $\Lambda$=1000 nm. Preferred examples will be given in the following of the present description.

The voids may be advantageously disposed substantially according to a hexagonal lattice, that allows to obtain an almost optimal symmetry of the guided mode and a low birefringence of the microstructured fiber.

Preferably, the microstructured fiber 2 is single mode at least in the wavelength band comprising the optical signal to be amplified. For the purposes of the evaluation of the monomodality of the fiber, the 2 m cutoff wavelength may be used. For transmission at wavelengths around 1550 nm or higher, the microstructured fiber 2 is preferably single mode for wavelengths higher than or equal to 1430 nm.

In order to meet the preferred specifications for the effective area, and/or the dispersion and/or the monomodality of the fiber set above, the geometrical characteristics and the disposition of the voids around the core may be found by techniques readily available to the skilled in the art. Typically, such techniques involve the use of simulation software tools. The voids may have substantially the same diameter or not: for example, they may be disposed around the core so that an inner cladding region comprising voids having a larger diameter with respect to an outer cladding region may be defined, as in the U.S. Pat. No. 5,802,236 cited above.

Advantageously, the birefringence of the microstructured fiber 2 may be low, in order to reduce the onset of problems related to DGD in the Raman amplifier. Preferably, the DGD of the Raman amplifier 1 may be lower than 1/6 of the time slot set for the bit rate of the system. For example, a suitable value of maximum DGD for a bit rate of 2.5 Gbit/s is about 70 ps. As another example, a suitable value of maximum DGD for a bit rate of 10 Gbit/s is about 20 ps.

In order to keep the noise figure of the Raman amplifier 1 low, the length of the microstructured fiber 2 may be preferably lower than or equal to 2000 m, more preferably lower than or equal to 1000 m, even more preferably lower than or equal to 500 m.

Preferably, the noise figure of the Raman amplifier 1 may be lower than or equal to about 10 dB, more preferably lower than or equal to about 6 dB.

The silica-based core comprises silica and at least one dopant suitable for enhancing the Raman effect inside the core of the microstructured fiber with respect to a microstructured fiber having an all-silica core. A preferred suitable dopant is germanium, typically embodied in its oxide $GeO_2$. Other suitable dopants can be phosphorus or boron, typically embodied in their oxides $P_2O_5$ and $B_2O_3$, respectively. In the remainder of the description, specific reference will be given to germanium doping: the skilled in the art can adapt the teachings given in the present description in case of use of another dopant.

By "dopant suitable for enhancing the Raman effect" it is intended a dopant that can enhance the value of Raman gain coefficient $g_R$ of the material comprised in the core of the microstructured fiber with respect to the value of the Raman gain coefficient of pure silica. For the purposes of the present invention, in order to understand if a dopant is suitable for enhancing the Raman effect reference should be made to the bulk value of the Raman gain coefficient of the material comprised in the core of the microstructured fiber with respect to the bulk value of the Raman coefficient of pure silica.

It has to be noticed that in the literature relating to optical fibers, with "Raman gain coefficient" it is intended either the $g_R$ coefficient or the ratio $g_R/A_{eff}$. In the present description for Raman gain coefficient it is intended the $g_R$ coefficient.

An estimation of the Raman gain coefficient $g_R$ of a microstructured fiber having a silica-based core further comprising germanium may be obtained by the germanium concentration C in the core, according to the following approximated formula [3]:

$$g_R = g_{RSiO2} \cdot (1-C) + g_{RGeO2} \cdot C \quad [3]$$

where $g_{RSiO2}$ is the Raman gain coefficient of pure bulk silica and $g_{RGeO2}$ is the Raman gain coefficient of pure bulk germania. A value reported in literature for $g_{RSiO2}$ at a wavelength of 1.55 μm is of about 7.74 10$^{-14}$ m/W; a value reported in literature for $g_{RGeO2}$ at a wavelength of 1.55 μm is of about 59.35 10$^{-14}$ m/W (see for example Lines, "Raman-gain estimates for high-gain optical fibers", J. Appl. Phys. 62(11), pag. 4363–4370 (1987)). Formula [3] gives a theoretical bulk value of the Raman gain coefficient $g_R$. In order to estimate more precisely the actual value of the Raman gain coefficient $g_R$ in the core of the fiber, the value estimated by formula [3] may be lowered by considering a less than complete Raman coupling between the signal propagating in the fiber and the pump radiation, due to a partial loss of signal radiation in the cladding of the fiber. This effect can be taken into account by multiplying the value of $g_R$ estimated with the formula [3] by a corrective factor $(R_{core}/R_{mode})^2$, wherein $R_{core}$ is the radius of the fiber core and $R_{mode}$ is the radius of the mode of the signal radiation that propagates into the fiber. In this respect, Applicant believes that for a microstructured fiber such a corrective factor may be likely ignored, as the mode confinement in the core of a microstructured fiber is very effective, thanks to the high refractive difference between core and cladding due to the presence of the axially extending voids. Another corrective factor that may be applied to a value obtained by formula [3] in order to have a good estimation of $g_R$ is due to a possible less than perfect alignment between the polarization states of the signal radiation and of the pump radiation during the propagation into the fiber. This lowers the effectiveness of the Raman amplification in the fiber. However, a substantial independence of polarization may be obtained by coupling two pump sources through a polarization beam splitter as explained with reference to FIG. 1.

As an example, with a germanium concentration of 20% mol in the core of a microstructured fiber, the formula [3] would give a value of $g_R$ of about 18.06·10$^{-14}$ m/W.

Figure 2:
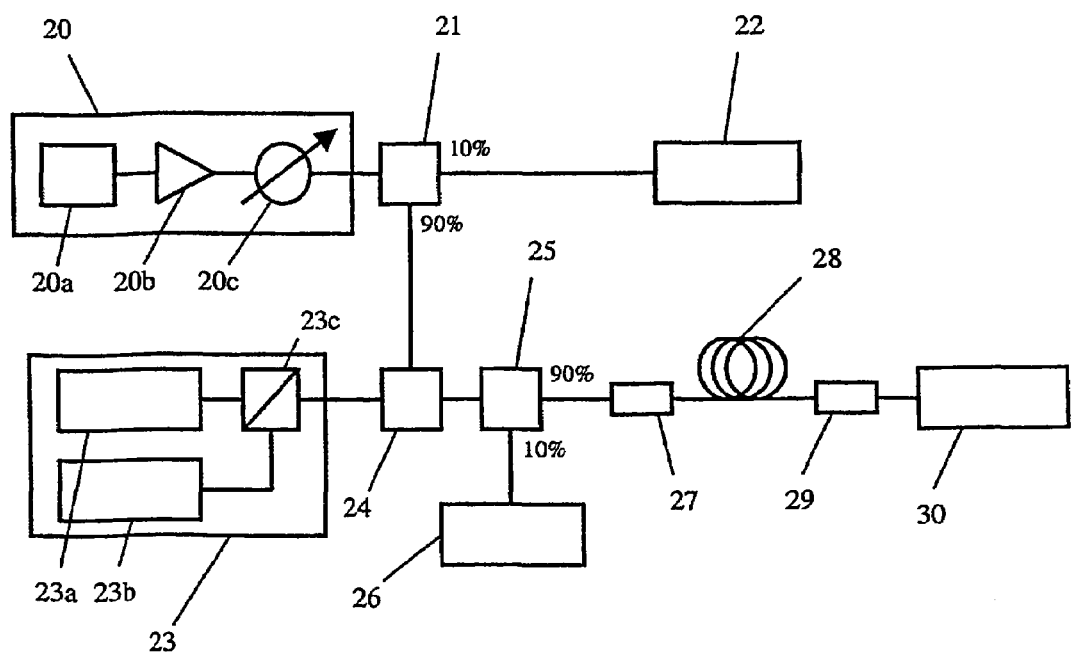
FIG. 2 schematically shows an experimental setup for a measure of the Raman gain coefficient of a fiber suitable for Raman amplification.

For a more precise evaluation of the actual value of the Raman gain coefficient $g_R$ of the fiber, an experimental setup as the one shown in FIG. 2 may be used. In FIG. 2 a laser source 20, tunable both in wavelength and in emitted power, is connected to a first 1×2 power splitter 21. The laser source 20 may comprise for example a wavelength tunable laser 20a, an erbium doped fiber amplifier 20b and a variable attenuator 20c. A first power meter 22 is connected to one of the two output ports of the power splitter 21. A pump system 23 is connected to one input port of a WDM coupler 24. The pump system 23 comprises two pump lasers 23a, 23b having substantially the same wavelength emission and substantially the same power emission, coupled to a polarization beam splitter 23c in such a manner as orthogonal polarization states are directed towards the WDM coupler 24. The second output port of the power splitter 21 is connected to a second input port of the WDM coupler 24. The output port of the WDM coupler 24 is connected to the input port of a second power splitter 25. A second power meter 26 is connected to one output port of the power splitter 25. A piece of optical fiber terminated with a first connector 27 is connected to the second output of the power splitter 25. First and second power splitter 21, 25 may be for example 90/10 power splitters. The "10%" output port of the power splitters should be connected to the power meters 22, 26. The fiber to be tested, indicated with the reference number 28 in FIG. 2, is optically connected during the measure between the first connector 27 and a second connector 29. The optical connection of the fiber 28 to be tested and the connectors 27, 29 may comprise focusing lenses or, more generally, a corrective optics, in order to optimize the coupling of the optical radiation in the fiber 28. Finally, an optical spectrum analyzer 30 is connected to the second connector 29.

With the experimental setup of FIG. 2, a curve of $g_R$ of the fiber 28 versus the wavelength of a signal radiation can be determined. The laser source 20 simulates the emission of a signal radiation and should be suitable for emitting radiation of wavelengths comprised in a wavelength range of interest. A preferred wavelength range is comprised between 1460 nm and 1650 nm. Pump lasers 23a and 23b have an emission wavelength that is related to the wavelength range of the laser source 20 used for the measure, according to the expected Raman shift. With silica-germania fibers, the frequency of the radiation emitted by the pump lasers 23a, 23b should be 13.2 THz lower than the frequency of the radiation emitted by the laser source 20. For example, the wavelength range of interest may be between 1525 nm and 1575 nm: for such wavelength range, suitable pump lasers to be used should have a wavelength comprised between about 1425 and 1475 nm. A curve of $g_R$ versus the wavelength range of interest can thus be plotted for the chosen pump wavelength (the same pump wavelength for the whole wavelength range of interest). For the purpose of the $g_R$ evaluation, the maximum value of $g_R$ in the wavelength range of interest is used. Different curves may be determined for each pump wavelength comprised in the useful pump wavelength range. In such case, the best value among the maximum $g_R$ is used.

The test should be carried out in the following way. With no test fiber 28 connected between connectors 27, 29, a calibration of the emitted power of the laser source 20 and of the pump system 23 is performed. For the calibration of the power meter 22, the pump lasers 23a, 23b are switched off, so that only radiation coming from the laser source 20 is directed towards the power meter 22 and a further power meter connected to the first connector 27. The calibration is made by equalizing the power read at the first power meter 22 with the power read at the further power meter connected to the connector 27. A similar calibration is made for the power meter 26, by switching off the laser source 20 and using the pump system 23. For the measure, the fiber to be tested 28 is connected between the connectors 27, 29 and both the laser source 20 and the pump system 23 are switched on, both emitting a continuous wave radiation. The erbium doped fiber amplifier 20b and the variable attenuator 20c may be used in order to vary the emitted power of the signal radiation. For each signal wavelength in the range of interest, the optical spectrum analyzer 30 gives the power $P_{out}$ output by the fiber 28 under test. The signal radiation power $P_{in}$ input into the fiber 28 can be in turn evaluated by the first power meter 22, once the calibration according to what stated above has been done. The ratio $P_{out}/P_{in}$ gives the gain G. In order to correctly calculate the gain G, possible optical losses caused by the optical connections of the fiber 28 under test to the connectors 27, 29 should be added to the value of output power $P_{out}$ read on the spectrum analyzer 30.

The gain G thus determined is related to the Raman gain coefficient $g_R$ by the following formula [4]:

$$G = \exp(g_R P_{pump} L_{eff}/A_{eff}) \quad [4]$$

where $P_{pump}$ is the pump power of only one of the pump lasers 23a, 23b, $A_{eff}$ is the effective area of the fiber 28 at the pump wavelength and $L_{eff}$ is an effective length related to the length of the fiber 28 and to the attenuation of the fiber $\alpha_p$ at the pump wavelength by the following formula [5]:

$$L_{eff} = \frac{1}{\alpha_p}[1 - \exp(-\alpha_p L)] \quad [5]$$

The formula [4] gives a gain known as "on-off gain". If the attenuation characteristics and the effective area of the fiber 28 are known, the value of $g_R$ for any signal wavelength can be determined. If the effective area of the fiber 28 at the pump wavelength is not known with good precision, the value of the ratio $g_R/A_{eff}$ can be determined. In order to use the formula [4], the measure should be carried out in the so called "small signal regime", that is by ensuring that the signal radiation power and the pump radiation power are such that saturation is not caused in the fiber 28. In order to verify such a case, a small enhancement of the input signal power (for example 1 dB) should correspond to an equal small enhancement of the output power from the fiber 28 under test. On the other hand, a smaller enhancement of the output power with respect to the enhancement of the input power indicates that the fiber is in saturation regime.

The germanium concentration C in the core of the microstructured fiber, as well as the attenuation $\alpha_p$ at the pump wavelength and the effective area $A_{eff}$ at the pump wavelength of the microstructured fiber, may be preferably chosen so as to obtain a value of at least 5 1/W/dB for the figure of merit for Raman amplification given by the above formula [1], preferably of at least 10 1/db/W. A value of at least 5 1/W/dB for the figure of merit allows to obtain high gain efficiency for the Raman amplifier 1, that is a high gain of the Raman amplifier can be obtained with low pump power requirements. With such values of figure of merit, a single stage of a Raman amplifier according to the invention may obtain a gain of 15 dB with less than 200 mW of pump radiation power per pump laser, with a length of microstructured fiber in a range of about 500–2000 m. Higher values of figure of merit for Raman amplification, for example of 15 1/W/dB may be obtained with the microstructured fiber according to the invention, thus allowing higher Raman efficiency.

It has to be noticed that in a microstructured fiber the voids provided in the cladding of the fiber act to lower the effective refractive index below the refractive index of the core. The properties of light confinement, for example the effective area of the fiber, depends practically only on the disposition of the voids around the core and not on a difference between the actual refractive index of the core and the actual refractive index of the cladding. This means that in the microstructured fiber 2, comprising germanium, or another dopant suitable for enhancing Raman effect, in the core, the characteristics of light confinement do not practically depend on the concentration of germanium. This even allows the possibility of using very high concentrations of germanium in the core of the microstructured fiber 2, in order to reach very high values of $g_R$. In practice, the only constraint that can limit the concentration of germanium in the core of the microstructured fiber 2 may be imposed by technological limits in the manufacturing process of the germanium-silica core. Typically, a concentration higher than 30% of germanium may be problematic to implement. Preferably, the germanium concentration in the core of the microstructured fiber 2 may be higher than or equal to 8% mol, more preferably higher than or equal to 10% mol, even more preferably higher than or equal to 20%.

On the contrary, in a conventional germanium-silica optical fiber having a germanium-silica core and a silica cladding the confinement of light depends on the refractive index difference between the core and the cladding determined by the presence of germanium in core. In this case, the concentration of germanium cannot be enhanced without constraints, as the refractive index of the core depends on such concentration, and an uncontrolled enhancement of the germanium concentration in the core would affect basic optical characteristics of the fiber, such as for example the monomodality of the fiber, the effective area, the attenuation and so on. In particular, the effective area and the germanium concentration results to be correlated with each other. On the other hand, such a correlation can be avoided with a microstructured fiber.

The above feature is very important, in that an uncorrelation between the effective area and the concentration of germanium in the core of the Raman amplifying fiber allows to separately control the two parameters $g_R$ and $A_{eff}$. As said, $g_R$ can be enhanced by providing a high germanium concentration in the core. This, in turn, allows to keep a higher value for the effective area of the microstructured fiber (controlled by the disposition of the voids), still maintaining an acceptable value of figure of merit for Raman amplification. Preferably, the effective area of the microstructured fiber may be higher than or equal to 3 µm. More preferably, values of effective area comprised in a range between 4 and 6 µm² may be used. This is important in order to facilitate coupling of the optical signal and of the pump radiation in the microstructured fiber 2. In this respect, it has to be noticed that in a conventional fiber minimum values of effective area in the range between 10–15 µm² are reached without affecting basic optical properties of the fiber, i.e. higher values with respect to those obtainable with a microstructured fiber.

Further, as the attenuation of a microstructured fiber is still, up to now, quite higher than the attenuation of a conventional fiber (2.6 dB/km in the best cases for the former, lower than 0.5 dB/km for the latter), a higher value of Raman gain coefficient $g_R$ allows to maintain a high figure of merit for Raman amplification even in case of relatively high attenuations. In this respect, it has to be noticed that an even high germanium concentration does not introduce a significant amount of attenuation in a microstructured fiber, as compared with the attenuation introduced by the manufacturing method. This is not true in a conventional fiber, that has a much lower attenuation: in such case, in order to reach an acceptable value of figure of merit according to formula [1], the weight of an even small attenuation enhancement (for example 0.2 dB) for a conventional fiber would be much more problematic with respect to the same attenuation enhancement experienced by a microstructured fiber.

Thus, according to the invention, in a microstructured fiber comprising a dopant suitable for enhancing the Raman effect, the three parameters $g_R$, $A_{eff}$ and $\alpha_p$ can be separately controlled in order to reach an acceptable value of figure of merit for Raman amplification. Advantageously, the Raman gain coefficient can be made high without practically affecting the effective area or substantially affecting the attenuation of the fiber. Advantageously, the higher attenuation of the microstructured fiber with respect to a conventional fiber can be compensated by a reduction of the effective area and/or by an enhancement of the Raman gain coefficient. Advantageously, the actual value of the effective area of the fiber can be chosen by taking into account practically only the coupling between the microstructured fiber and the other components of the Raman amplifier.

On the other hand, with respect to a microstructured fiber having pure silica in the core, the microstructured fiber according to the invention has advantageously a higher value of the Raman gain coefficient $g_R$. This allows to maintain high values of figure of merit for Raman amplification even with relatively high values of effective area. This facilitates coupling of the microstructured fiber to the other components of a Raman amplifier.

The following are preferred summarized specifications for a microstructured fiber according to the invention, for a Raman amplifier suitable for amplification in a wavelength range around 1550 nm:
Raman enhancing dopant: $GeO_2$;
$GeO_2$ concentration: 20–25% mol;
Attenuation at 1450 nm (pump wavelength): less than 5 dB/km;
Attenuation at 1550 nm (signal wavelength): less than 5 dB/km;
Effective area at 1450 nm: 4–6 $\mu m^2$;
Fiber length: 400–2000 m;
Dispersion at 1550 nm: more than or equal 40 ps/nm/km in absolute value;
Cutoff wavelength: less than 1430 nm;
Voids diameter (d): 0.3–4.0 $\mu m$;
Distance between voids ($\Lambda$): less than 4 $\mu m$;
Ratio d/$\Lambda$: more than 0.35;
Cladding diameter: more than 100 $\mu m$, typically 125 $\mu m$ (for compatibility with standard fibers).

EXAMPLE 1

Figure 3:
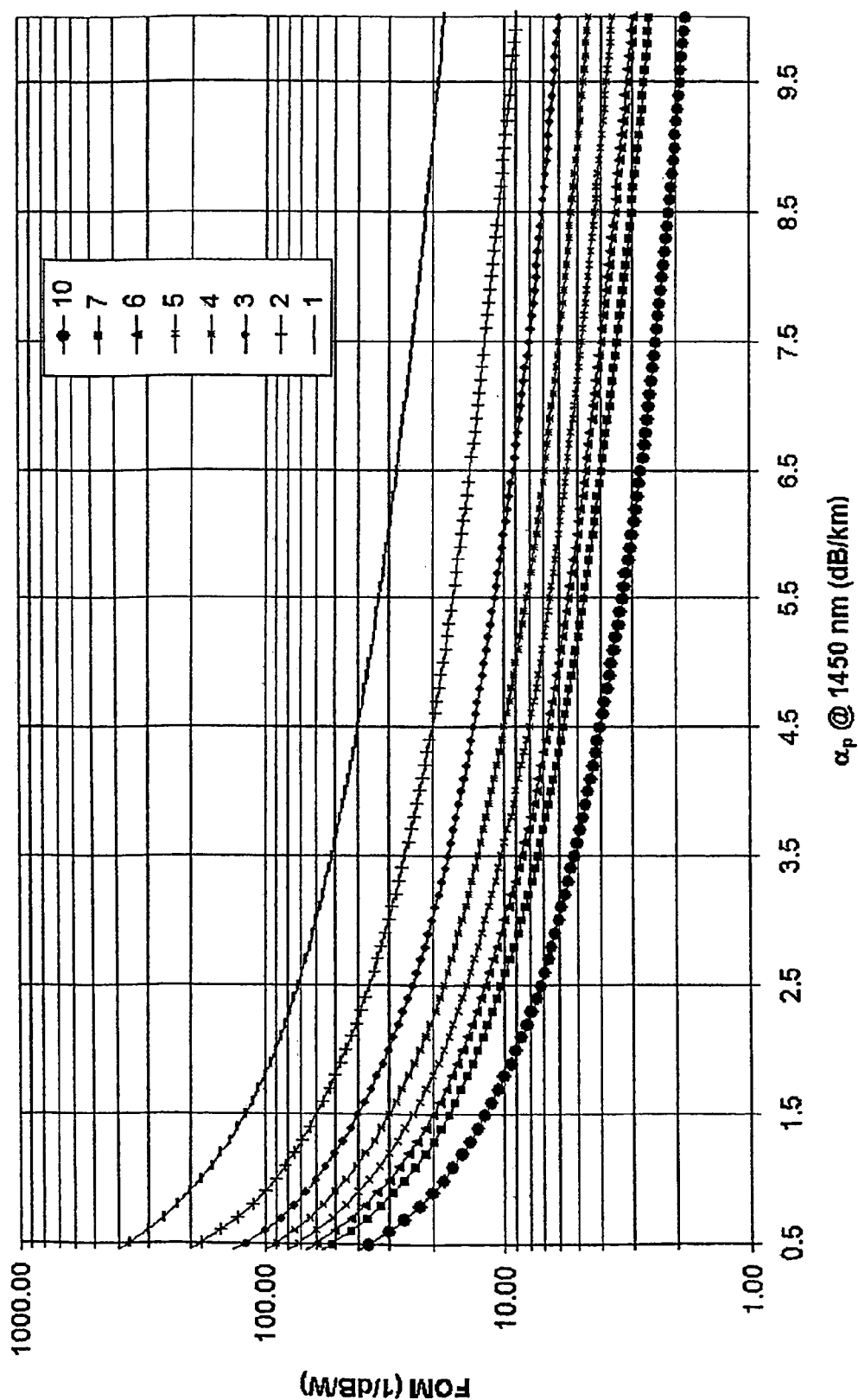
FIG. 3 shows several curves of figure of merit for Raman amplification according to formula [1] versus attenuation at a pump wavelength of 1450 nm, that can be obtained with a microstructured fiber according to the invention.

FIG. 3 shows several curves representing the figure of merit for Raman amplification according to formula [1] versus the attenuation at the pump wavelength for a microstructured fiber having a silica core doped with 20% mol of germania. In order to plot the curves, a value of $g_R$ at 1550 nm of $18 \cdot 10^{-14}$ m/W has been assumed for the microstructured fiber. Different curves correspond to different values of effective area of the fiber, according to the legend added in FIG. 3.

As it can be seen, values of figure of merit of about 10 1/dB/W can be obtained with relatively high values of both attenuation (3–4 dB/km) and effective area (4–6 $\mu m^2$). This is advantageous, as a relatively high value of attenuation allows to use an easier manufacturing process, while a relatively high value of effective area facilitates coupling.

With lower values of attenuation and/or effective area, exceptionally high values of figure of merit may be obtained (>15 1/dB/W). This is important mainly in view of possible future improvements in the manufacturing process of microstructured fibers in order to reduce the attenuation below values of 2 dB/km.

EXAMPLE 2

Figure 4:
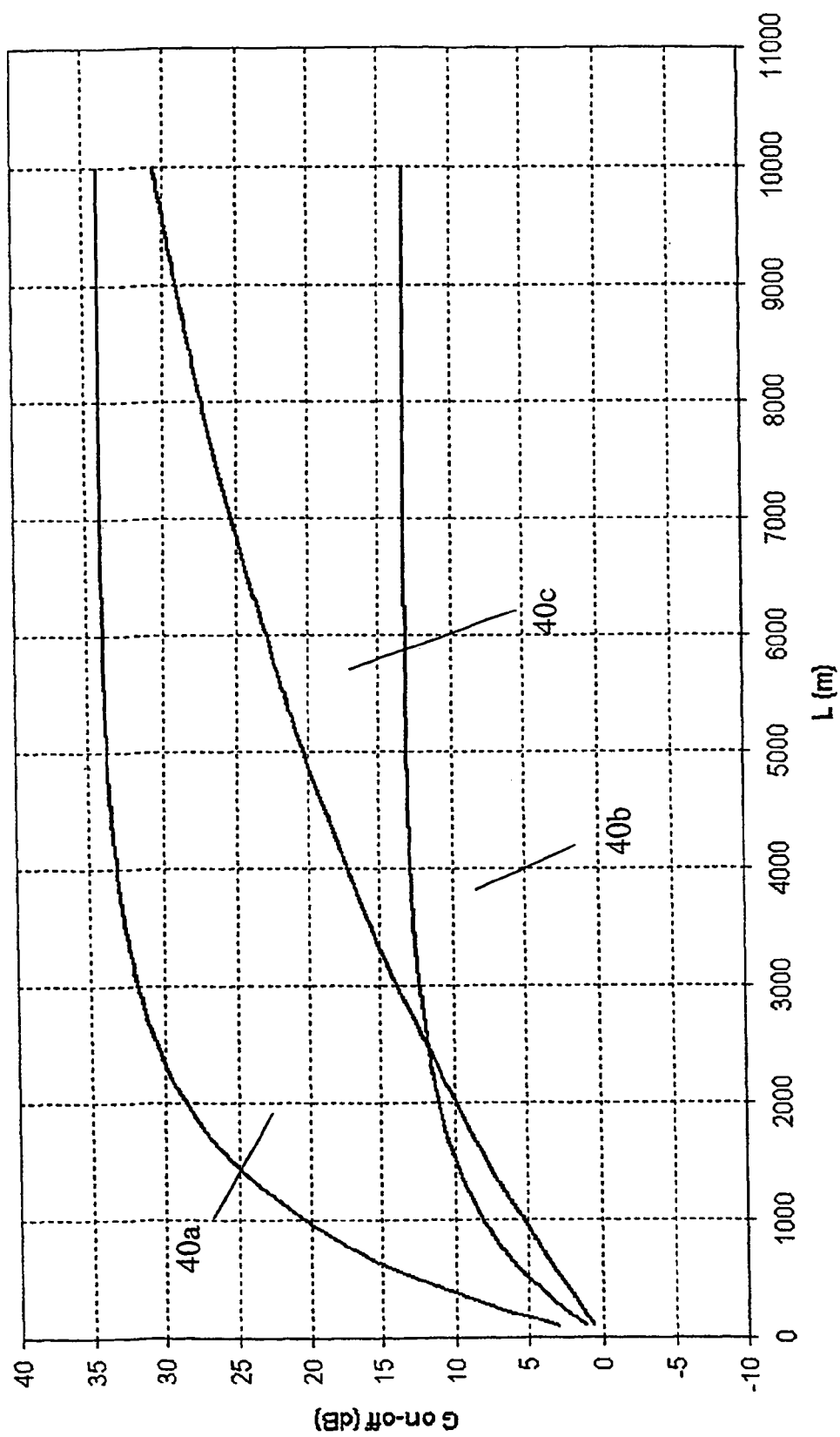
FIG. 4 compares the on-off gain versus the length of the Raman amplifying fiber that can be obtained with a microstructured structure fiber according to the invention (40a), with a microstructured fiber having a pure silica core (40b) and with a highly non-linear fiber according to the prior art (40c)

The Applicant has made a series of simulations for a configuration of a Raman amplifier according to FIG. 1. A signal having a wavelength of 1550 nm and a pump radiation having a wavelength of 1450 nm were considered. The power emitted by each pump laser was supposed to be 200 mW. FIG. 4 shows three curves representing the on-off gain that can be obtained by using for the Raman amplifier a microstructured fiber according to the invention (curve 40a), a microstructured fiber having a pure silica core (curve 40b) and a High Non-Linear Fiber according to the article of Tsuzaki et al. (curve 40c), versus the length of the fiber. The on-off gain was calculated by using formulae [4], [5]. A value of $18 \cdot 10^{-14}$ m/W at 1550 nm of the Raman gain coefficient, an effective area of 5 $\mu m^2$ and an attenuation at the pump wavelength of 1450 nm of 4 dB/km have been assumed for plotting the curve 40a. A value of $7.74 \cdot 10^{-14}$ m/W at 1550 nm of the Raman gain coefficient, an effective area of 5 $\mu m^2$ and an attenuation at the pump wavelength of 1450 nm of 4 dB/km have been assumed for plotting the curve 40b. According to the article of Tsuzaki et al., a value of the ratio $g_R/A_{eff}$ of $6.50 \cdot 10^3$ and an attenuation of 0.7 dB/km at the pump wavelength of 1450 nm have been assumed for plotting the curve 40c. As it can be seen from FIG. 4, curve 40a is the highest one and allows to reach high on-off gains (15–20 dB) within a relatively short length of fiber in the range of 500–1000 m. Advantageously, such short length allows to obtain low noise figure of a Raman amplifier and allows to set a very compact package for a lumped amplifier. Differently, curve 40b, representing the on-off gain obtainable with a microstructured fiber having a pure silica core, reaches a lower gain with respect to curve 40a; for this fiber, in order to enhance the maximum obtainable gain, the effective area should be lowered, with a consequent arising of coupling problems. Curve 40c reaches an even lower on-off gain within a longer length of fiber (about 2.5 km).

EXAMPLE 3

Figure 5:
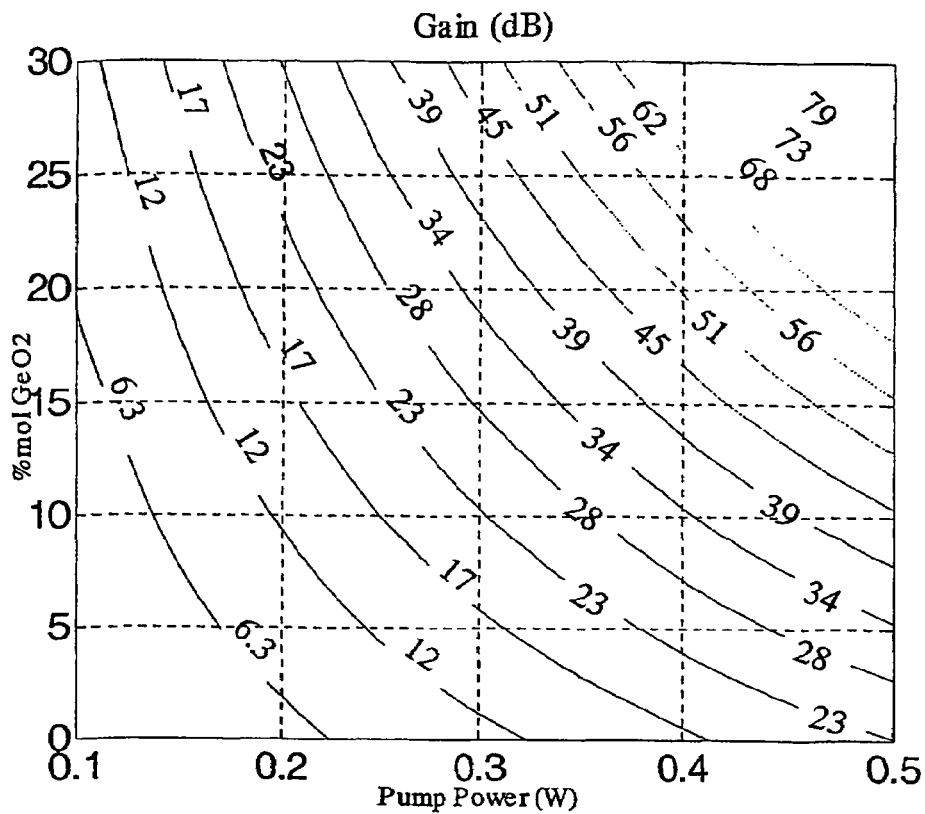
FIG. 5 shows several level curves of the gain that can be obtained with microstructured fibers according to the invention, as a function of the concentration of dopant and of the pump power.

FIG. 5 shows a series of level curves of the Raman gain peak that can be reached by a microstructured fiber according to the invention. The Raman gain peak was evaluated as $G = G_{on-off} e^{-\alpha L}$, wherein $G_{on-off}$ was calculated by using the formula [4], $\alpha$ is the attenuation of the fiber at the signal wavelength and L is the length of the fiber. In order to plot the level curves of FIG. 5 the maximum value of G versus the length L was considered. An effective area of 5 $\mu m^2$, an attenuation at the pump wavelength of 4.0 dB/km and an attenuation at the signal wavelength of 4.0 dB/km have been assumed. The level curves are shown in a plot having in the x-axis the pump power for each laser source, in a configuration of Raman amplifier having two pump lasers coupled through a polarization beam splitter, and in the y-axis the germania concentration. The Raman gain coefficient $g_R$ has been evaluated for each germania concentration according to formula [3]. The value of the calculated Raman gain peak is shown in correspondence of the level curves. As it can be seen, values of Raman gain peak higher than 20 dB can be obtained with a pump power lower than 300 mW and germania concentrations higher than 10%.

EXAMPLE 4

Figure 6:
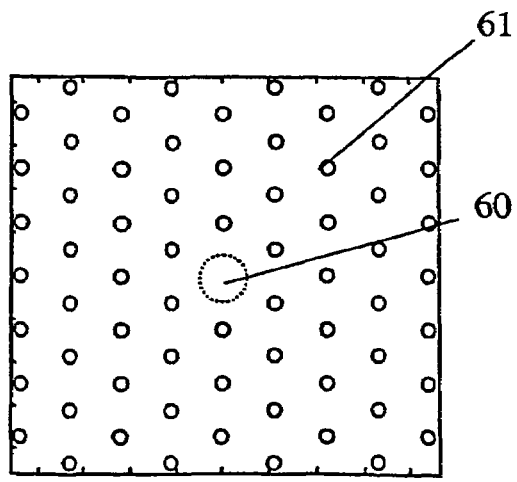
FIG. 6 shows a portion of a section of an ideal microstructure fiber having voids disposed according to a hexagonal lattice.

In order to design a microstructured fiber having the specifications given above, the Applicant has made a series of simulations by using the commercial software Beam Prop, marketed by R-Soft, Ossining (New York, USA), that gives a fully vectorial propagating solution to the Maxwell equations. Typical parameters to be evaluated for a microstructured fiber are the diameter of the voids d and the distance between the voids $\Lambda$. The voids are assumed to ideally have the same diameter and to be disposed around the core according to an ideal regular hexagonal lattice. FIG. 6 shows a portion of a section of this ideal microstructured fiber, comprising a core 60 and a plurality of voids 61 disposed around the core 60.

A core comprising silica and a 20% mol of germanium is assumed. The refractive indexes and the material dispersion of the core are given by the Sellmaier equations. It is also assumed that the diameter D of the core is equal to 0.9 $\Lambda$.

Such a value may avoid the diffusion of the germanium dopant in the voids, with consequent loss of the same dopant.

Figure 7:
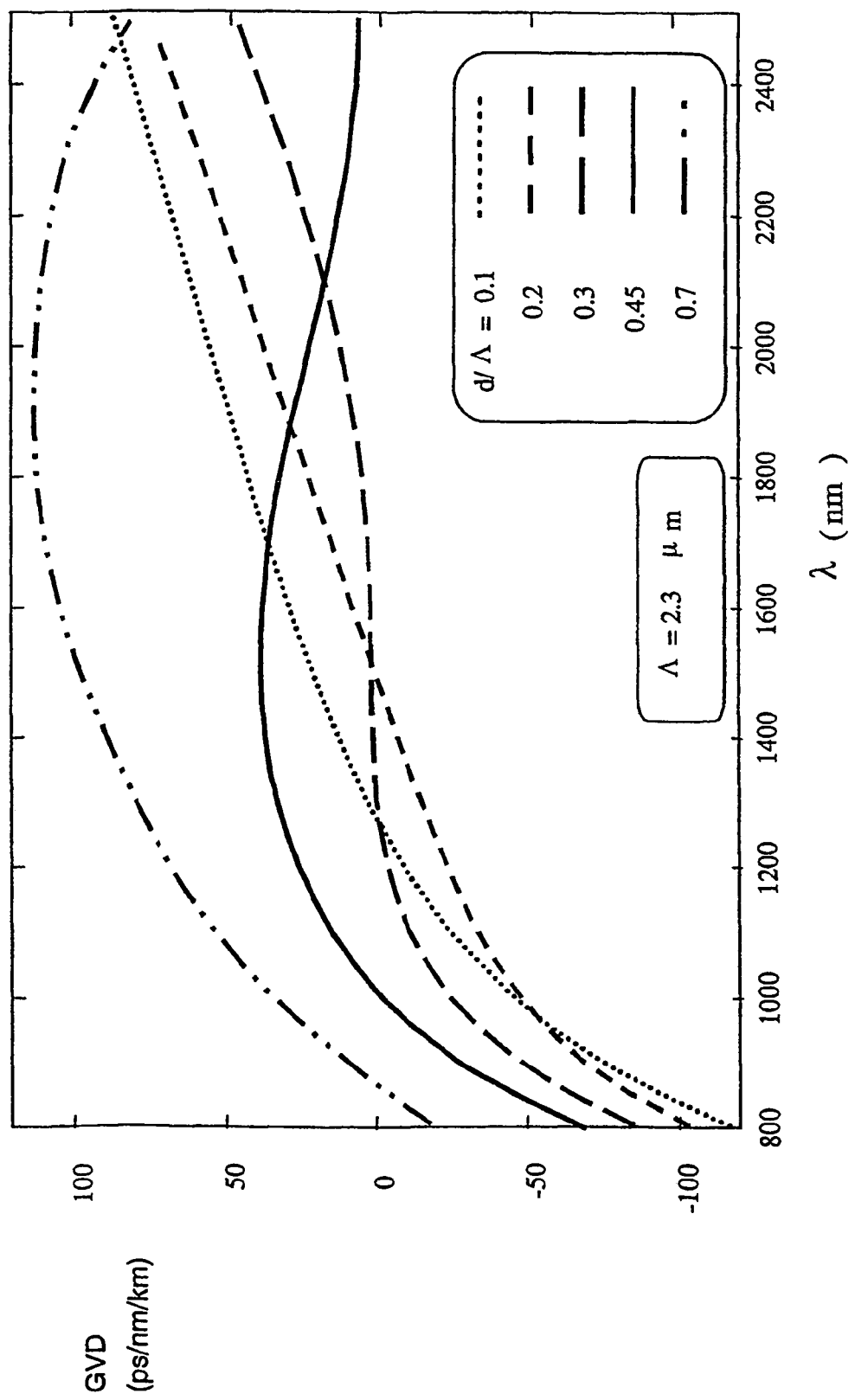
FIGS. 7 to 10 show several dispersion curves of microstructured fibers according to the invention.

FIG. 7 shows several dispersion (GVD) curves versus wavelength obtained with a value for the distance between the voids Λ of 2.3 μm. The different curves correspond to different values of the ratio d/Λ, according to the legend added in FIG. 7. As it can be seen, an increase in the ratio d/Λ results in an oscillation of the dispersion curve and in a shift of the curve to higher wavelengths. Such oscillation is due to the fact that for large d/Λ the total dispersion is strongly dominated by waveguide dispersion, in spite of material dispersion.

Figure 8:
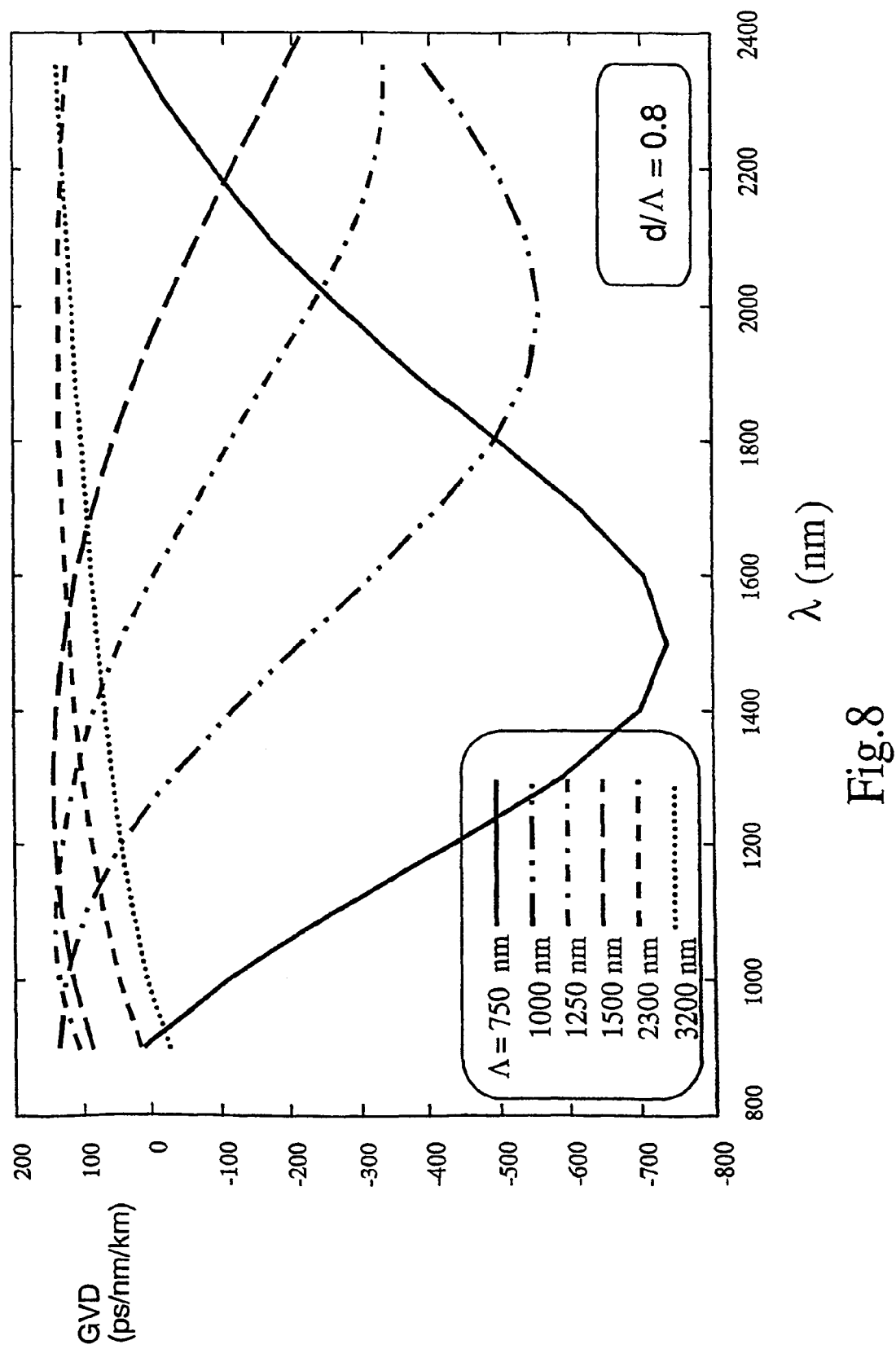

FIG. 8 shows several dispersion curves versus wavelength obtained with a ratio d/Λ equal to 0.8. The different curves correspond to different values of distance between voids Λ, according to the legend added in FIG. 8. As it can be seen, an increase of the lattice pitch Λ gives a shift of the dispersion curve to higher wavelengths and a weak lowering of the amplitude of the oscillation.

Figure 9:
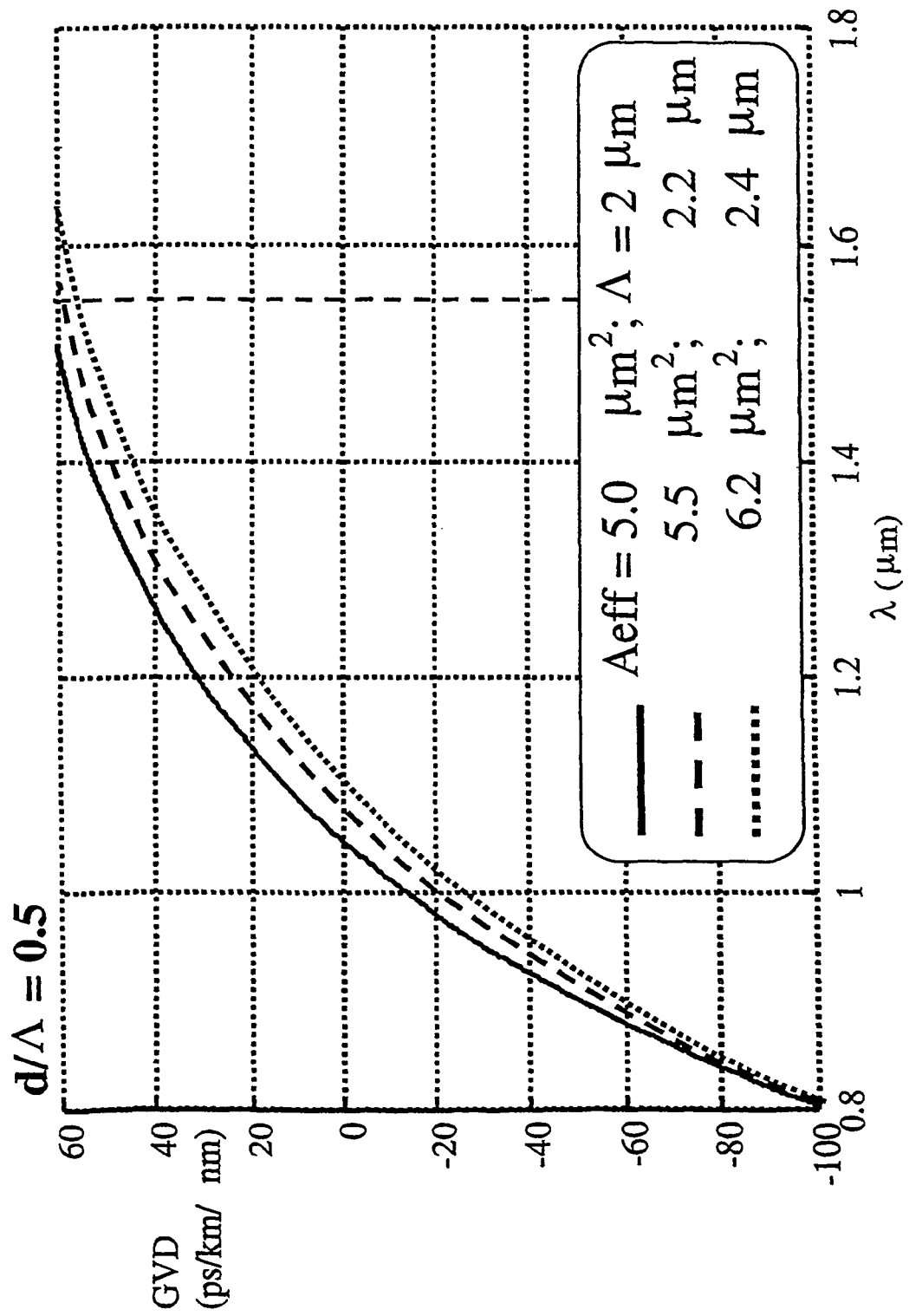

FIG. 9 shows three dispersion curves versus wavelength obtained with a ratio d/Λ equal to 0.5. The different curves correspond to different values of distance between voids Λ, according to the legend added in FIG. 9. A vertical dashed line highlights the wavelength of 1550 nm. The increase of the lattice pitch Λ results n a small decrease of dispersion and in an increase of the effective area, respectively of 5.00 μm$^2$, 5.50 μm$^2$, 6.20 μm$^2$.

Figure 10:
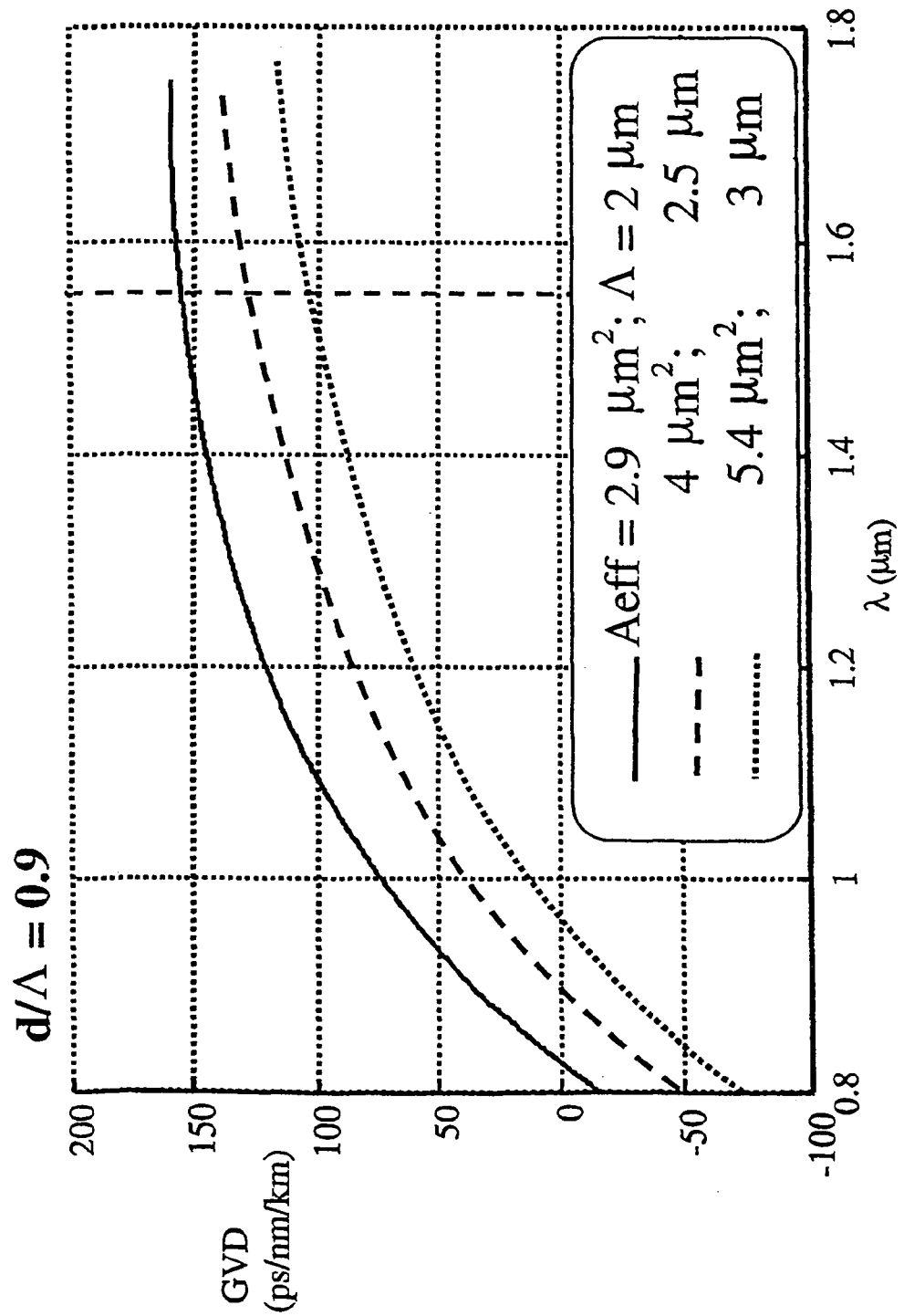

FIG. 10 shows several dispersion curves versus wavelength obtained with a ratio d/Λ equal to 0.9. The different curves correspond to different values of distance between voids Λ, according to the legend added in FIG. 9. A vertical dashed line highlights the wavelength of 1550 nm. The increase of the lattice pitch Λ results in a small decrease of the dispersion and in an increase of the effective area, respectively of 2.90 μm$^2$, 4.00 μm$^2$, 5.40 μm$^2$. As it can be seen, smaller values of effective area are obtained with an increase of the ratio d/Λ (at the same value of Λ), together with an enhancement of the dispersion at 1550 nm, with respect to the cases shown in FIG. 9.

Table 1 summarizes a set of preferred embodiments of microstructured fibers satisfying at least some of the specifications given above:

TABLE 1

| d/Λ | Λ (μm) | Effective Area at 1550 nm (μm$^2$) | Dispersion at 1550 nm (ps/nm/km) | Number of guided modes at 1430 nm |
|---|---|---|---|---|
| 0.5 | 1.85 | 4.55 | +80 | 1 |
| 0.5 | 2.00 | 5.00 | +70 | 1 |
| 0.5 | 2.15 | 5.50 | +59 | 1 |
| 0.6 | 2.00 | 4.30 | +86 | 1 |
| 0.6 | 2.15 | 4.80 | +83 | 2 |
| 0.6 | 2.30 | 5.20 | +80 | 2 |
| 0.7 | 2.50 | 5.20 | +92 | 3 |
| 0.9 | 3.00 | 5.40 | +102 | 7 |

Figure 11:
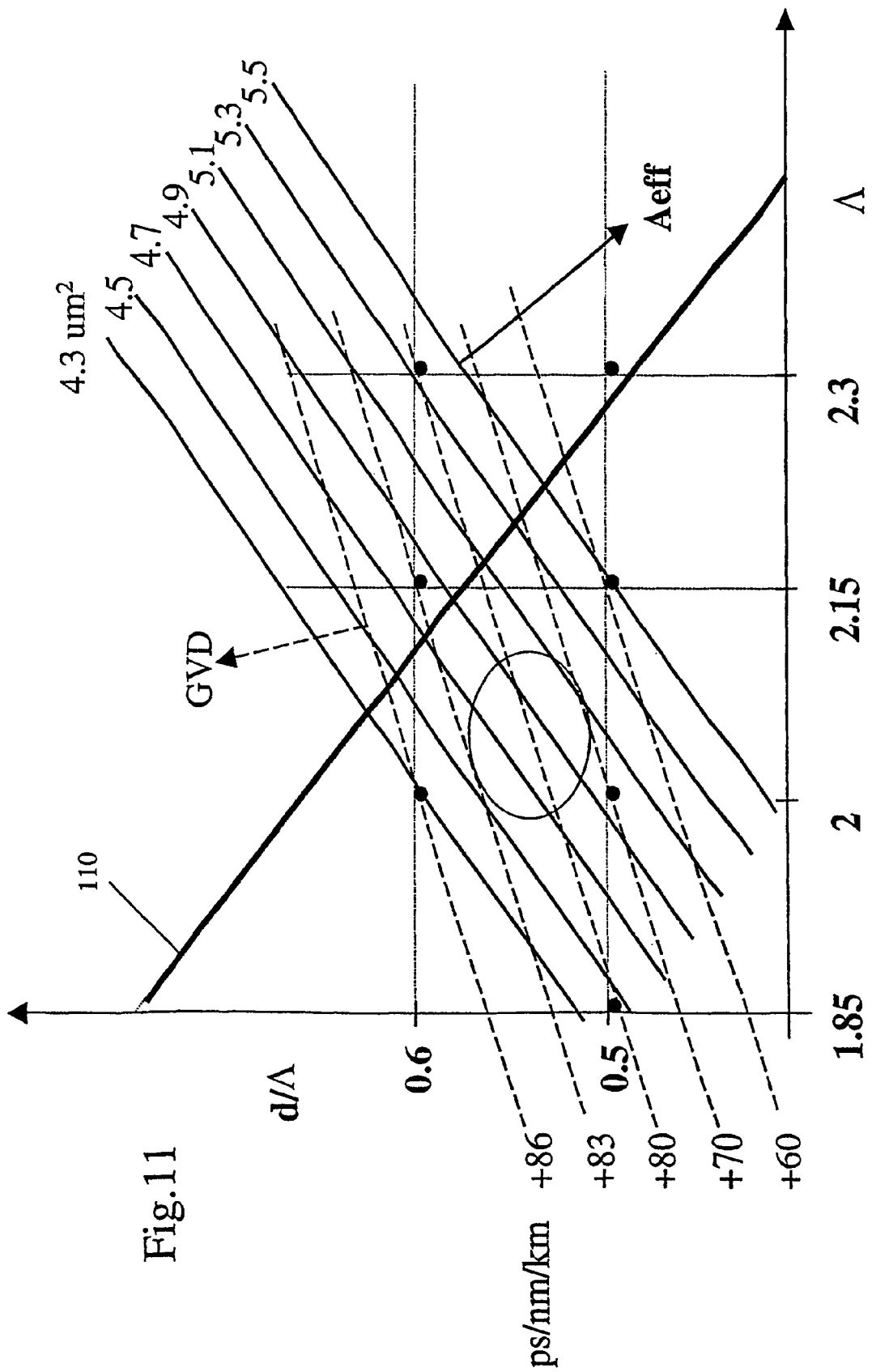
FIG. 11 shows several level curves of both chromatic dispersion and effective area as a function of the distance between voids and of the ratio between the voids diameter and the distance between voids of microstructured fibers according to the invention, with a preferred region highlighted.

FIG. 11 schematically shows several level curves for the dispersion and the effective area in a plot having the lattice pitch Λ (in arm) in the x-axis and the ratio d/Λ in the y-axis. A further straight line referenced as 110 roughly separates a region in which the fiber is single mode at 1430 nm (below line 110) from a region in which the fiber is multimode at 1430 nm (over line 110). A preferred region in which the microstructured fiber is single mode, has an effective area of between 4.3 μm$^2$ and 5.5 μm$^2$ and a dispersion higher than about 60 ps/nm/km can be defined in FIG. 11, in which the ratio d/Λ is comprised between about 0.4 and 0.6 and the lattice pitch Λ is comprised between about 1.85 and 2.15 μm. A more preferred region is highlighted, corresponding to a ratio d/Λ comprised between about 0.5 and 0.55 and to a lattice pitch Λ comprised between about 1.95 and 2.10 μm.

EXAMPLE 5

Figure 12:
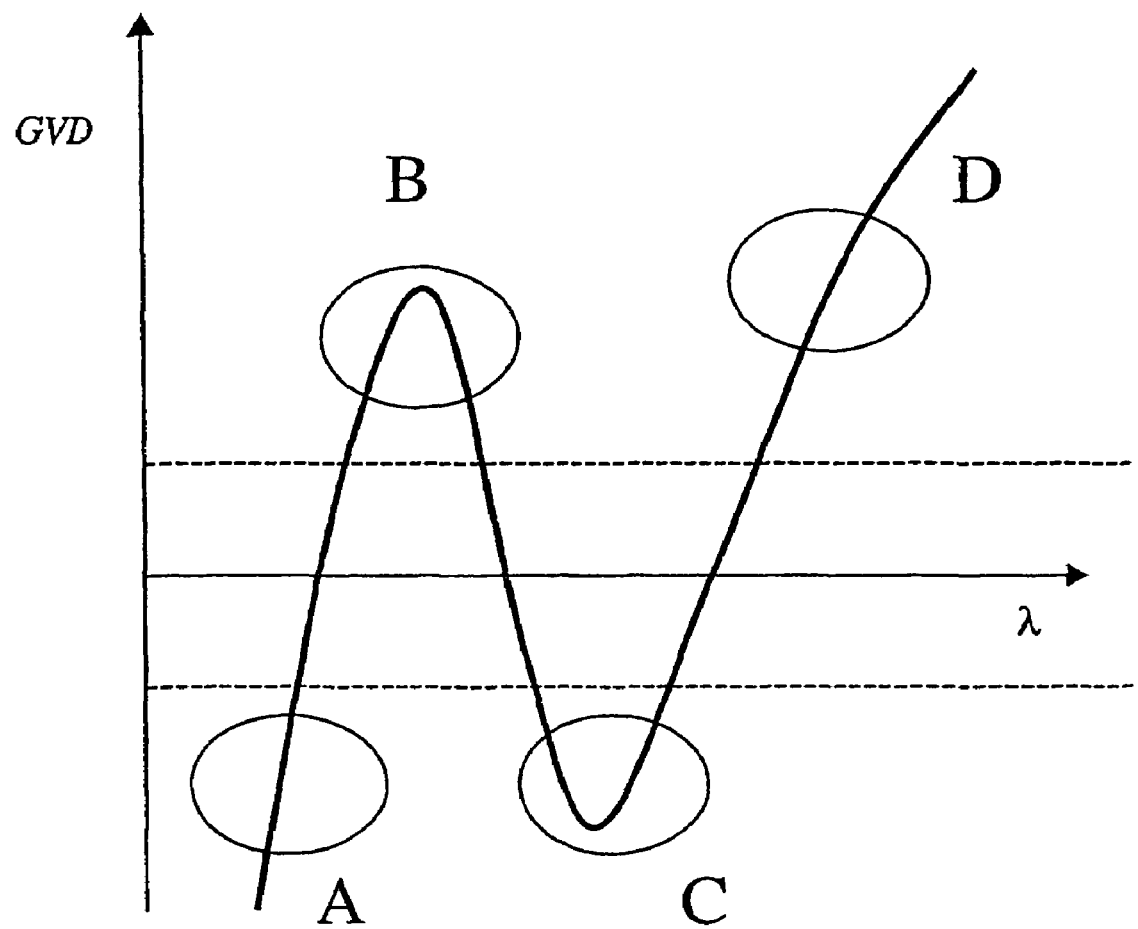
FIG. 12 shows a general dispersion curve of a microstructured fiber in which the waveguide dispersion dominates the material dispersion.

FIG. 12 schematically shows a general dispersion curve having an oscillation for a microstructured fiber in which the waveguide dispersion dominates the material dispersion. As it can be deduced from FIG. 12, high absolute values of dispersion can be obtained in the regions labeled by A, B, C, D. Thus, the lattice pitch Λ and the ratio d/Λ should be varied in order to make the wavelength region around 1550 nm corresponding to one of the regions A, B, C, D. In the previous example 4 such technique has been exploited for region B. The Applicant has however verified that is in practice difficult to shift the dispersion curve so as to make the region A or the region D to correspond to a wavelength region around 1550 nm. On the other hand, a successful shift was obtained for region C. Microstructured fibers having high negative dispersion in the wavelength region around 1550 nm can be obtained by making the ratio d/Λ higher than or equal to 0.7 and the lattice pitch lower than 2.0 μm. Single mode fibers at 1430 nm can still be obtained. The effective area of such fibers results around a value of about 2 μm$^2$.

A set of the characteristics of an exemplary microstructured fiber according to the above is summarized in the following table 2.

TABLE 2

| Distance between voids [Λ] | μm | 1.1 |
|---|---|---|
| Diameter/distance [d/Λ] |  | 0.8 |
| Core Diameter [D] | μm | 0.99 |
| Effective area @ 1550 nm | μm$^2$ | 1.73 |
| Dispersion @ 1550 nm | Ps/nm/km | −89 |

What is claimed is:

1. A Raman amplifier comprising at least one microstructured fiber, and at least one pump laser, optically connected to one end of said microstructured fiber, said pump laser being adapted for emitting a pump radiation at a wavelength $\lambda_p$, said microstructured fiber comprising a silica-based core surrounded by a plurality of capillary voids extending in the axial direction of the fiber, said core comprising at least one dopant added to silica, said dopant being suitable for enhancing Raman effect.

2. The Raman amplifier according to claim 1, wherein said microstructured fiber has a maximum Raman gain coefficient $g_R$ in a wavelength region between 1460 nm and 1650 nm, an attenuation $\alpha_p$ at said wavelength $\lambda_p$ and an effective area $A_{eff}$ at said wavelength $\lambda_p$, wherein said maximum Raman gain coefficient $g_R$ said attenuation $\alpha_p$ and said effective area $A_{eff}$ are such that $(g_R/A_{eff})/\alpha_p$ is greater than or equal to 5 1/W/dB.

3. The Raman amplifier according to claim 2, wherein said maximum Raman gain coefficient $g_R$, said attenuation $\alpha_p$ and said effective area $A_{eff}$ are such that $(g_R/A_{eff})/\alpha_p$ is greater than or equal to 10 1/W/dB.

4. The Raman amplifier according to claim 1, wherein said dopant is chosen from a group comprising germanium, phosphorus and boron.

5. The Raman amplifier according to claim 4, wherein said dopant is germanium.

6. The Raman amplifier according to claim 5, wherein a concentration of germanium is higher than or equal to 8% mol.

7. The Raman amplifier according to claim 6, wherein said concentration is higher than or equal to 20% mol.

8. The Raman amplifier according to claim 1, wherein an effective area $A_{eff}$ of said microstructured fiber is lower than or equal to 10 µm² at said wavelength $\lambda_p$.

9. The Raman amplifier according to claim 8, wherein said effective area is lower than or equal to 7 µm² at said wavelength $\lambda_p$.

10. The Raman amplifier according to claim 1, wherein an effective area $A_{eff}$ of said microstructured fiber is higher than or equal to 3 µm² at said wavelength $\lambda_p$.

11. The Raman amplifier according to claim 1, wherein an attenuation $\alpha_p$ of said microstructured fiber is lower than or equal to 10 dB/km at said wavelength $\lambda_p$.

12. The Raman amplifier according to claim 11, wherein said attenuation $\alpha_p$ is lower than or equal to 5 dB/km at said wavelength $\lambda_p$.

13. The Raman amplifier according to claim 1, wherein a dispersion of said microstructured fiber is higher than or equal to 40 ps/nm/km in absolute value at a wavelength of 1550 nm.

14. The Raman amplifier according to claim 13, wherein said dispersion is higher than or equal to 70 ps/nm/km in absolute value at a wavelength of 1550 nm.

15. The Raman amplifier according to claim 1, wherein said microstructured fiber is single mode for wavelengths greater than or equal to 1430 nm.

16. The Raman amplifier according to claim 1, wherein a diameter of said voids is between 0.3 and 4.0 µm.

17. The Raman amplifier according to claim 1, wherein a distance between said voids is lower than 4.0 µm.

18. The Raman amplifier according to claim 1, wherein a ratio between a diameter d of said voids and a distance Λ between said voids is higher than 0.35.

19. The Raman amplifier according to claim 1, wherein a distance Λ between said voids is between 1.85 µm and 2.15 µm, and a ratio d/Λ between the diameter d of said voids and said distance Λ is between 0.4 and 0.6.

20. The Raman amplifier according to claim 1, wherein a distance Λ between said voids is lower than 2.0 µm, and a ratio d/Λ between the diameter d of said voids and said distance Λ is higher than 0.7.

21. The Raman amplifier according to claim 1, wherein a length of said microstructured fiber is lower than or equal to 2000 m.

22. The Raman amplifier according to claim 19, wherein the length of said microstructured fiber is lower than or equal to 1000 m.

23. The Raman amplifier according to claim 19, wherein the length of said microstructured fiber is lower than or equal to 500 m.

24. A microstructured fiber suitable for guiding an optical signal having a wavelength lying in a wavelength band between 1460 and 1650 nm, comprising a core surrounded by a plurality of capillary voids extending in the axial direction of the fiber, said core comprising silica and a dopant suitable for enhancing Raman effect, said fiber being further suitable for guiding a pump radiation having a wavelength $\lambda_p$ shifted with respect to at least one wavelength of said wavelength band in a lower wavelength region according to the Raman shift of said core, said fiber having a maximum Raman gain coefficient $g_R$ in said wavelength band, and an attenuation $\alpha_p$ and an effective area $A_{eff}$ at said wavelength $\lambda_p$, wherein said maximum Raman gain coefficient $g_R$, said attenuation $\alpha_p$ and said effective area $A_{eff}$ are such that $(g_R/A_{eff})/\alpha_p$ is greater than or equal to 5 1/W/dB.

25. The microstructured fiber according to claim 24, wherein said maximum Raman gain coefficient $g_R$, said attenuation $\alpha_p$ and said effective area $A_{eff}$ are such that $(g_R/A_{eff})/\alpha_p$ is greater than or equal to 10 1/W/dB.

26. The microstructured fiber according to claim 24 wherein said dopant is chosen from a group comprising germanium, phosphorus and boron.

27. A microstructured fiber comprising a core surrounded by a plurality of capillary voids extending in the axial direction of the fiber, said core comprising silica and germanium, wherein a concentration of germanium in said core is higher than or equal to 8%.

28. The microstructured fiber according to claim 27, wherein said concentration of germanium is higher than or equal to 20%.

29. The microstructured fiber according to claim 24 or 27, wherein an effective area $A_{eff}$ of said microstructured fiber is lower than or equal to 10 µm² at said wavelength $\lambda_p$.

30. The microstructured fiber according to claim 29, wherein said effective area is lower than or equal to 7 µm² at said wavelength $\lambda_p$.

31. The microstructured fiber according to claim 24 or 27, wherein an effective area $A_{eff}$ of said microstructured fiber is higher than or equal to 3 µm² at said wavelength $\lambda_p$.

32. The microstructured fiber according to claim 24 or 27, wherein an attenuation $\alpha_p$ of said microstructured fiber is lower than or equal to 10 dB/km at said wavelength $\lambda_p$.

33. The microstructured fiber according to claim 32, wherein said attenuation $\alpha_p$ is lower than or equal to 5 dB/km at said wavelength $\alpha_p$.

34. The microstructured fiber according to claim 24 or 27, wherein a dispersion of said microstructured fiber is higher than or equal to 40 ps/nm/km in absolute value at a wavelength of 1550 nm.

35. The microstructured fiber according to claim 34, wherein said dispersion is higher than or equal to 70 ps/nm/km in absolute value at a wavelength of 1550 nm.

36. The microstructured fiber according to claim 24 or 27, wherein said microstructured fiber is single mode for wavelengths greater than or equal to 1430 nm.

37. The microstructured fiber according to claim 24 or 27, wherein a diameter of said voids is between 0.3 and 4.0 µm.

38. The microstructured fiber according to claim 24 or 27, wherein a distance between said voids is lower than 4.0 µm.

39. The microstructured fiber according to claim 24 or 27, wherein a ratio between a diameter d is said voids and a distance Λ between said voids is higher than 0.35.

40. The microstructured fiber according to claim 24 or 27, wherein a distance Λ between said voids is between 1.85 µm and 2.15 µm, and a ratio d/Λ between the diameter d or said voids and said distance Λ is comprised 0.4 and 0.6.

41. The microstructured fiber according to claim 24 or 27, wherein a distance Λ between said voids is lower than 2.0 µm, and a ratio d/Λ between the diameter d of said voids and said distance Λ is higher than 0.7.

42. An optical transmission system comprising a transmitting station, a receiving station and an optical line between said transmitting station and said receiving station, said optical line comprising at least one Raman amplifier comprising at least one microstructured fiber and at least one pump laser, optically connected to one end of said microstructured fiber, said pump laser being adapted for emitting a pump radiation at a wavelength $\lambda_p$, said microstructured fiber comprising a silica-based core surrounded by a plurality of capillary voids extending in the axial direction of the fiber, said core comprising at least one dopant added to silica, said dopant being suitable for enhancing Raman effect.

* * * * *

UNITED STATES PATENT AND TRADEMARK OFFICE
CERTIFICATE OF CORRECTION

PATENT NO. : 7,116,469 B2
APPLICATION NO. : 10/499020
DATED : October 3, 2006
INVENTOR(S) : Attilio Bragheri et al.

It is certified that error appears in the above-identified patent and that said Letters Patent is hereby corrected as shown below:

Title page, item (75), line 1, "Glulia" should read --Giulia--.

Claim 2, column 16, line 51, "$g_R$ said" should read --$g_R$, said--.

Claim 24, column 17, line 57, "$\lambda_p$shifted" should read --$\lambda_p$ shifted--.

Claim 40, column 18, line 46, "or" should read --of--.

Signed and Sealed this

Sixth Day of March, 2007

JON W. DUDAS
*Director of the United States Patent and Trademark Office*